Dec. 1, 1936.  E. MILLER  2,062,522
GLASS FORMING MACHINE
Filed June 12, 1933  3 Sheets-Sheet 1

Inventor
EDWARD MILLER

By Finckel & Finckel
Attorneys

Dec. 1, 1936.  E. MILLER  2,062,522
GLASS FORMING MACHINE
Filed June 12, 1933  3 Sheets-Sheet 2

Inventor
EDWARD MILLER
By
Finckel & Finckel
Attorneys

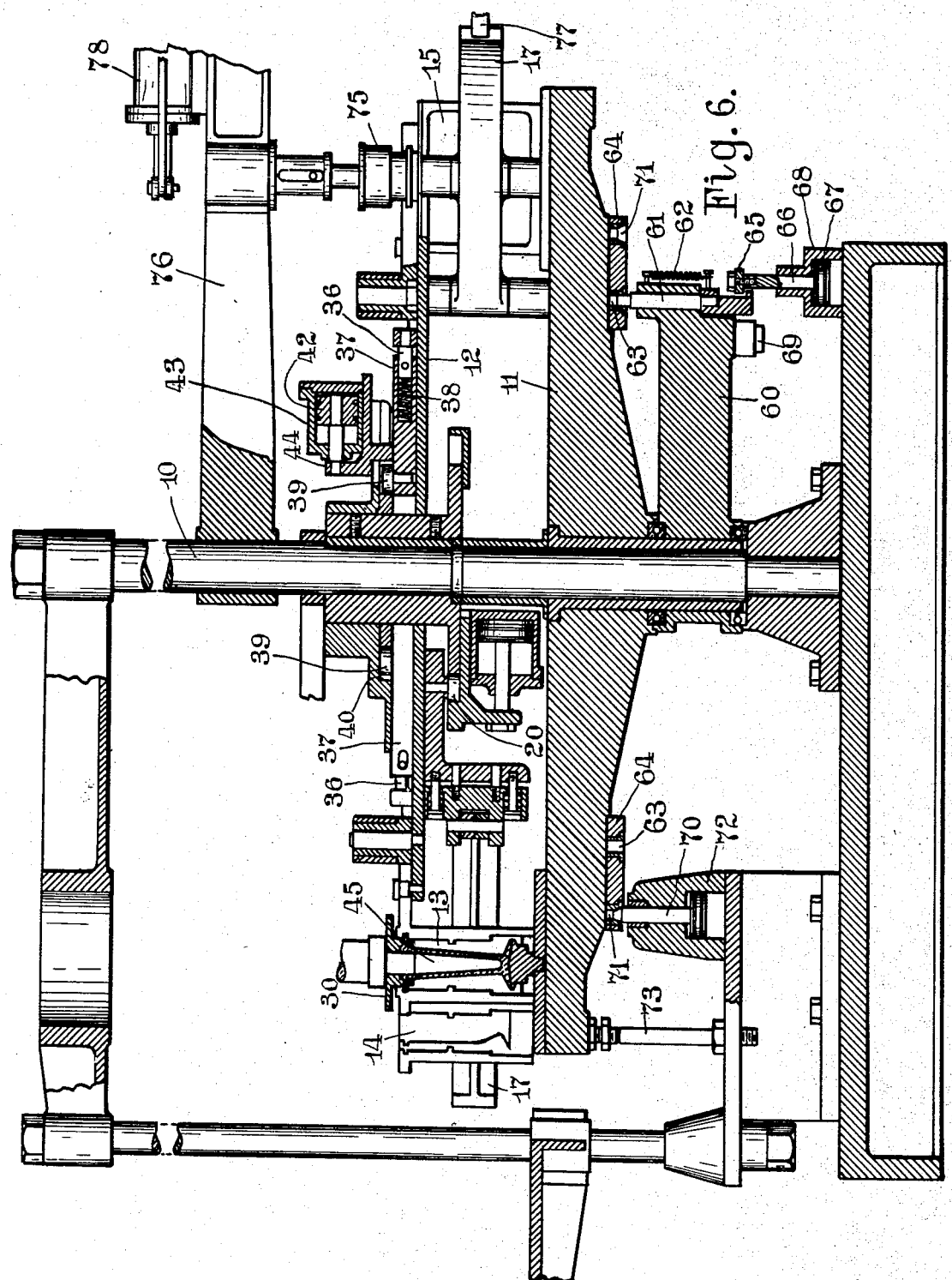

Patented Dec. 1, 1936

2,062,522

UNITED STATES PATENT OFFICE 2,062,522

GLASS FORMING MACHINE

Edward Miller, Columbus, Ohio, assignor to Lynch Corporation, Anderson, Ind., a corporation of Indiana Application June 12, 1933, Serial No. 675,432

25 Claims. (Cl. 49—9)

This invention relates to glass ware machines such as machines for the shaping of glass articles such as bottles, jars and the like, and my invention aims to improve existing machines of this type. In one particular embodiment of the invention, for example, in the manufacture of bottles, such as milk bottles, the invention may be embodied in a machine of the pressing and blowing type wherein molds with suitable operating mechanism are carried around a central column to cause and permit the necessary treatment of the molten or plastic gob of glass. Usually in such machines the gob is first pressed in a suitable mold to form a parison and the parison subsequently transferred to a blow mold to be expanded or shaped by air pressure into the article of final form.

Because the parison is still hot and soft at the time of its transfer it is subject to distortion or injury by the movements thereof in effecting its transfer laterally from the parison mold to the blow mold.

One of the principal objects of the present invention is to avoid said movement of the parison and to accomplish this I provide means whereby the parison is held in its original position and the blow mold moved to it. Other objects will appear from the disclosure herein.

The invention is advantageously illustrated with reference to a pressing and blowing machine and is embodied in the examples herein shown and described the features of novelty being finally claimed.

In the accompanying drawings, of which there are three sheets—

Fig. 6 is a vertical section on the line VI—VI Fig. 5 broken out horizontally and on a larger scale but showing more details than appear in Fig. 5.

Figure 1:
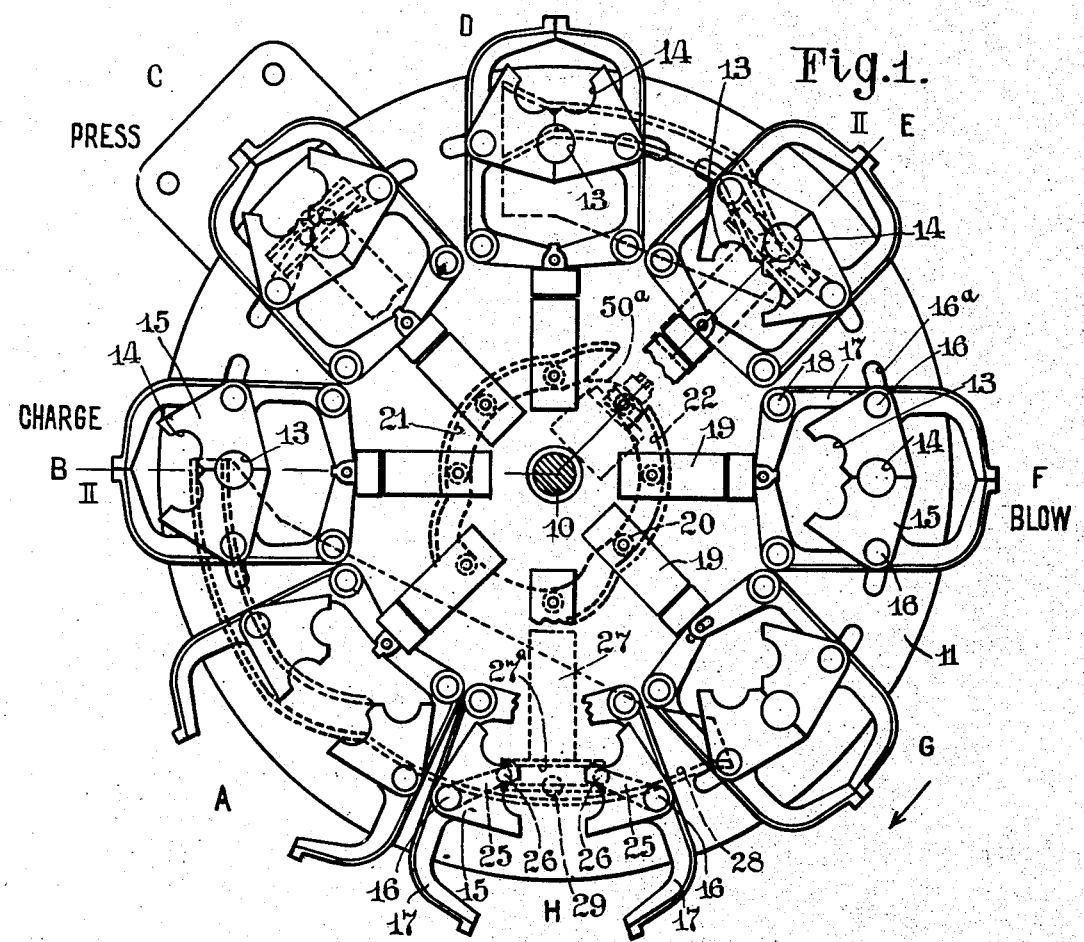
Figure 1 is a plan view with parts broken out of the mold-carrying table with the molds and their operating means.
Figure 2:
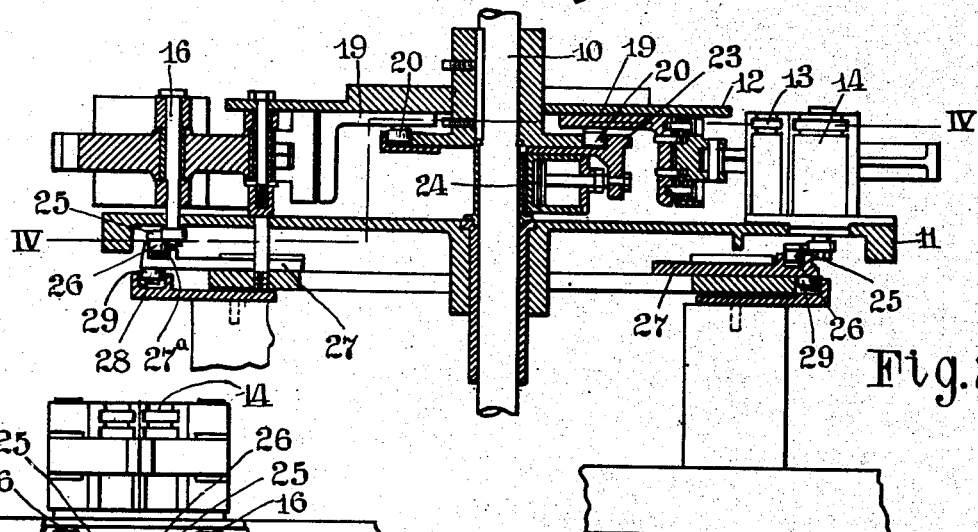
Fig. 2 is a vertical section on the line II—II Fig. 1.
Figure 3:
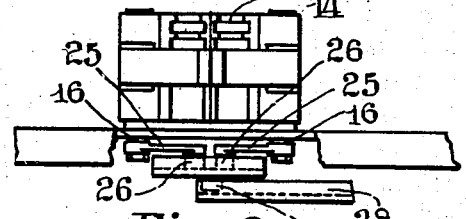
Fig. 3 is a detail view in elevation looking at the left hand mold shown in Fig. 2, a portion of the rim of the table being broken out showing a portion of the means for operating the mold parts.

In the views 10 designates the central column about which the mold table 11 and the neck ring table 12 are rotated in unison preferably with an intermittent, or start and stop, movement, as shall hereinafter appear in detail.

According to my invention I secure or form each of the halves of two molds—the parison mold 13 and the blow mold 14—in one block or cage 15, each cage being pivoted by a pin 16 to a bell-crank lever 17 fulcrumed at 18. The pivot pin 16 of each block or cage extends through an arcuate slot 16ᵃ (Fig. 1) in the mold table permitting rocking movement of the levers 17 so that the blocks can be swung toward and from each other respectively to closed and opened position. The half molds in each cage are formed in faces that lie in intersecting planes, each plane being at right angles to a radius of the axis of the pivot 16 of the cage, and so that corresponding halves of the individual molds can be registered to form the complete mold when the blocks are shifted for that purpose on their axes 16. Corresponding inner arms of the bell crank levers 17 are connected by a pin and slot connection to radially arranged bars 19 that by radial movement respecting the table cause the outer arms of the bell-crank levers to swing apart upon outward movement or upon inward movement toward each other thereby opening or closing the molds respectively.

The lower end of the pivot pins 16 of the blocks or cages have secured to them crank arms 25 (see Figs. 1, 2, 3, and 4) that have at their free ends downwardly extended rollers 26 that permanently engage a cross groove 27ᵃ in the end of a radially sliding stem portion 27 (see Figs. 1, 2, 3, and 4) said cross groove standing at right angles to said stem portion 27. The function of the cross groove is to oscillate the mold cages and to do this the lower side of the cross groove portion of the sliding stem portion 27 may have a downwardly projecting roller 29, the position of which is controlled by fixed cam grooves 28, formed and timed to oscillate the blocks 15 on pins 16 by moving the pivot pins 16 and rollers 26 inward or outward to form the parison or blow mold.

Each of the bars 19 is provided with a downwardly extended roller 20 that enters stationary cam grooves 21 and 22. The cam groove 21 is designed to swing the bell-crank levers 17, first to closed position to present (at charging station B) (Fig. 17) the closed parison mold 13 for the reception of the gob of molten glass and the pressing or forming at station C of the parison by the plunger 45 (see Fig. 6) and connecting said parison by the pressed glass with the neck ring; subsequently the cam groove 22 holds the blow mold parts closed for the blowing operation at blowing station F) and finally said block members 15 are separated by operation of the bell-crank levers for the ware take-out or removing operation (at station H).

The so-called "transfer" operation, that is the operation whereby the mold sections are shifted to inclose the parison in the blow mold is effected between the positions D and E of the blocks, as best seen in Fig. 1. In said transfer operation the bar 19 is pressed outward by the bulging portion 50ª of the fixed center cam 50 thereby separating the outer arms of the bell-crank levers 17 carrying the cages 15 and their molds away from the parison, this being permitted by arcuate slots 16ª in the table. After this and while the cages are still laterally separated the mold blocks are turned on their pivots 16 by slide 27 actuated by the inward slant of cam 28 after which the blocks are closed tightly together by means of the shouldered slide 23 actuated by the fluid pressure piston 24 engaging the roller 20. The operation of said piston rods draws back the arm 17 inward thereby swinging the cages together; and when the roller 20 leaves the slide 23 it enters the cam groove 22 by which the cages 15 are held with their blow mold sections closed together around the parison and in position to be blown to form the ware at the position or station marked F.

When the cages are shifted from the position as in station D, into the other position, as at station E, the position of the mold axis is not changed and the blow mold is closed around the parison without lateral shifting of the parison. This permits of a rapid transferring without danger of distorting the parison and makes possible an increased blowing and cooling time for a given number of molds.

The blow head is shown at 75 (Fig. 6) said head being supported by arm 76 and moved downward into blowing position as usual. At the time the ware is blown the levers 17 may be clamped together at 77 actuated from suitable obvious means operated by a fluid pressure cylinder located at 78.

The mold blocks 15 pass through station or position G without actuation upon the ware to permit some cooling thereof.

In connection with the parison and blow molds there is employed a neck ring and after the gob of glass, of definite predetermined quantity, is dropped into the parison mold, it is immediately pressed with a plunger 45 and is displaced into the neck ring cavity as shown in Fig. 6. In this illustrated form the neck ring travels with the glass the entire circuit of the molds and until the finally blown article is removed from the blow mold.

Figure 5:
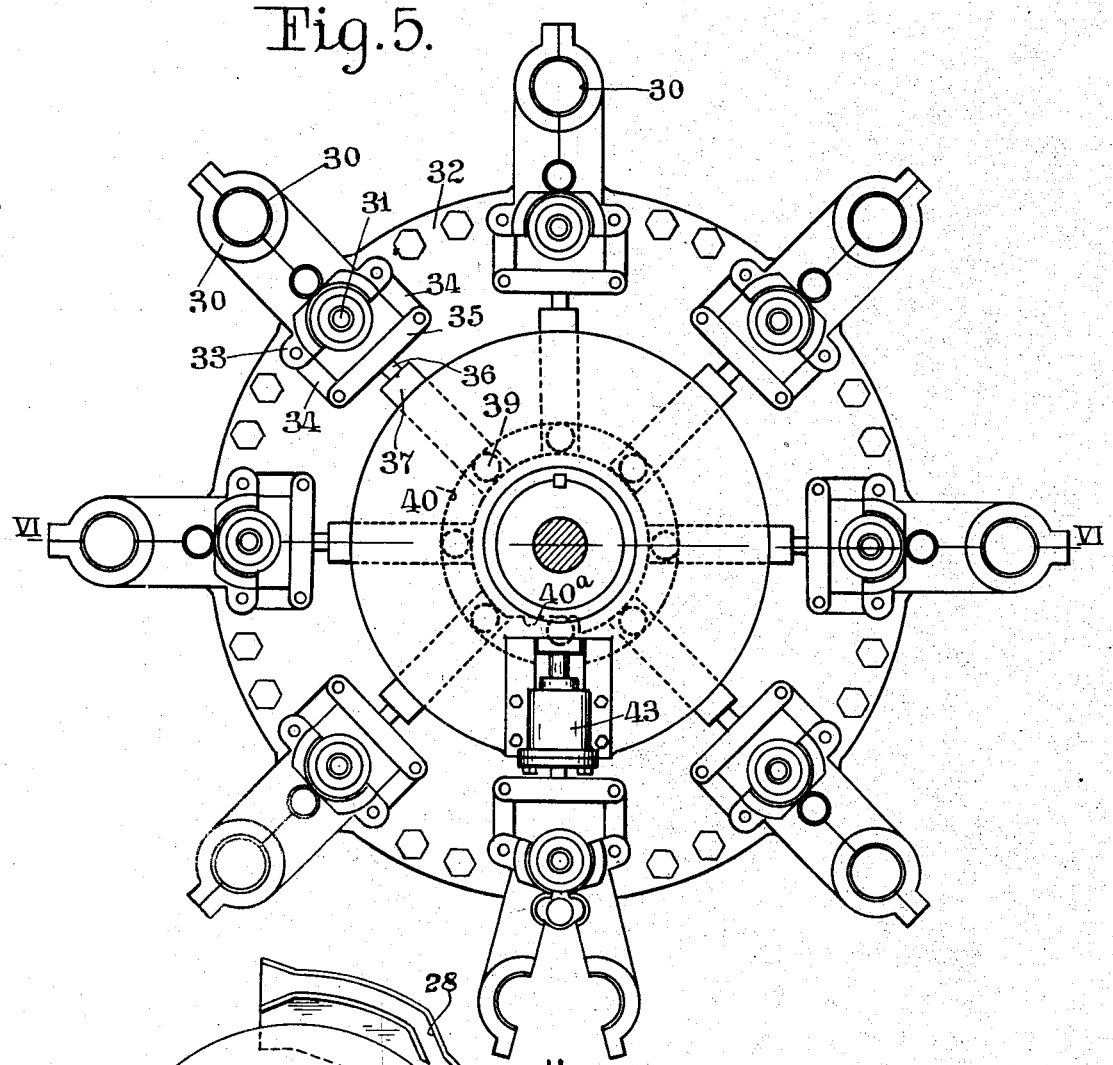
Fig. 5 is a plan view of the neck ring table with the neck ring holders thereon.
Figure 4:
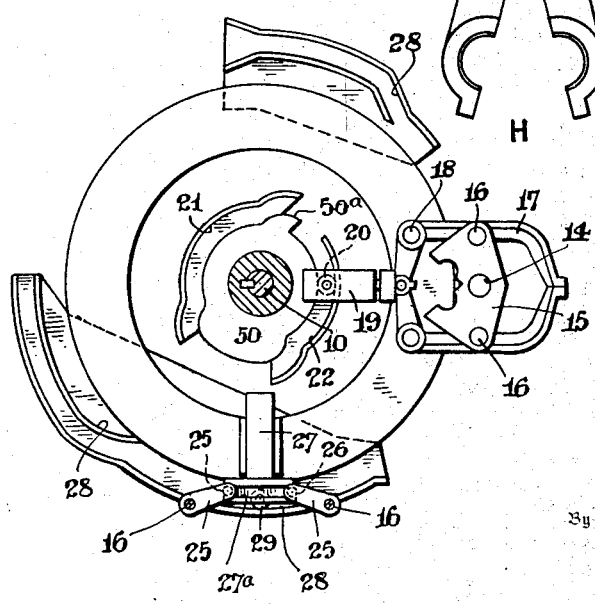
Fig. 4 is a plan view looking down from the line IV—IV Fig. 2.

Referring now to Figs. 5 and 6 the parts of the neck ring are shown at 30, 30, the two parts being hinged together at 31 on a circular support 32 coaxial with the mold carrier 11, the hinge pins 31 serving to connect the mold carrier 11 and neck mold carrier 12 together for movement in unison. The number and vertical location of the neck rings coincide with those of the molds below and cooperate with said molds through the circuit of operation. Said neck ring parts 30, 30, are provided with outwardly projecting ears 33 to which are pivoted links 34, 34, connected together by a cross bar or link 35. Connected with said cross bar 35 is a stem 36 having a sliding pin and slot connection with the tubular portion of a radial bar 37, said tubular portion containing a spring 38 tending to hold the neck ring parts together when they are closed. At its inner end the bar 37 is provided with an upwardly projecting roller 39 entered in groove 40. The bounding walls of the groove 40 are circular except for a cut-away portion 40ª in the inner wall coinciding vertically with the radius of the take-out station H of the mold cages. In the circuit of operation the neck rings are held closed when the parison is formed and said neck rings each support the parison during the entire circuit of operation until it arrives at the take-out station H at which time the neck ring parts are separated or opened immediately after the opening of the molds proper below. This separation of the neck ring parts may be effected by means of fluid pressure acting on a piston 42 in a stationarily mounted cylinder 43, the rod of said piston carrying a block 44 to press the roller 39 into the cut-away portion of the inner wall of the groove 40.

The tables may advantageously be intermittently rotated by suitable means as for instance an arm 60 journaled around the center column, said arm carrying at its outer end a vertical pin 61 that is actuated in an upward direction by a spring 62 so that the pin will engage in a socket 63 in a plate 64 secured to the lower part of the table 11. Arm 60 has attached to it at 69 the end of a piston rod reciprocated by a fluid pressure cylinder (not shown), the function of which is to push the arm 60 and pin 61 to rotate the table 11, and at the end of the stroke the pin 61 is withdrawn by a lug 65 on the upper end of the rod 66 of a piston 67 in a cylinder 68. An arresting and holding latch 70 for the table is provided at a position on the table diametrically opposite the pin 61, said arresting latch being the piston rod of a fluid pressure cylinder 72 and said rod having a tapered end to engage a socket 71 neighbor to the socket 63 in the plate 64.

Adjustably secured in the base of the machine is a bracing post 73 positioned below the region where pressure is exerted on the glass in the molds to prevent canting of the table at its center bearing by such pressure.

I have referred to the blocks or cages 15 as such it being customary in such machines to secure by screws in such blocks or cages removable pieces having cut therein the counterparts of the exterior of the parison and the glass article to be produced by the machine. By the term cage I include such member with a molding member whether or not the latter is integral with the cage.

In some instances the part of the glass article formed and held by the neck ring is removable also, it being apparent that the neck ring may be released from the glass article at any time after it is enclosed by the blow mold sections 14.

The construction and arrangement of the mold blocks or cages, the disposition and arrangement of the sections or cavities together with the operating mechanism therefor, is inducive to high speed operation of the machine. Each mold cage being independently mounted on its own rock shaft or pivot, may be quickly and easily shifted to bring either the parison mold and blow mold cavity around the glass. This may be done very quickly as the mold cages need only be rocked through a small arc, less than 180° and preferably less than 90°. Hence the transfer may be effected without undue loss of time, and in the case of pressing and blowing articles, final blowing may take place quickly after transfer.

The forms and arrangement of the parts can obviously be varied without departing from the scope of the invention as claimed.

What I claim is:

1. In a glass forming machine, a pair of pivoted cage members, each member of the pair carrying a section of a parison and a blow mold with registerable faces to form the respective molds, the mold sections of each cage being arranged side by side and said faces lying in planes at angles to each other, and each face at right angles to a radius through the axis of the pivot and a separate neck mold for shaping the neck of the ware and for supporting the glass parison independently of either mold section.

2. In a glass forming machine, a pair of pivoted cage members, each member carrying a section of a parison and a blow mold with registerable faces, said faces lying in planes at angles to each other and a separate neck mold adapted to cooperate with both the parison mold and blow mold sections when closed, for supporting the glass parison independently of either mold section.

3. In a glass forming machine, a pair of cage members, each member carrying a registerable section of a parison and a blow mold, a movable carrier on which said members are mounted, and means rendered operative by movement of the carrier for moving said cage member to alternately separate and close said mold sections, the parison mold sections of each mold cage being closed while the blow mold sections of the same cage are open.

4. In a glass forming machine, a pair of cage members, each member carrying a registerable section of a parison and a blow mold, means on which said members are pivotally mounted, a neck mold mounted above the registering sections of the molds, said neck molds being independent of either the parison or blow molds and adapted to cooperate with the registering parison mold sections to permit shaping of the neck portions of the article therein and to cooperate with the registering sections of the blow mold to permit transfer of the parison thereto and means for closing the sections of the parison mold independently of the sections of the blow mold.

5. In a glass forming machine, a pair of cage members, each member carrying a registerable section of a parison and a blow mold, a neck mold mounted above the registering sections of the molds, said neck molds being independent of either the parison or blow molds and adapted to cooperate with the registering parison mold sections to permit shaping of the neck portions of the article therein and to cooperate with the registering sections of the blow mold to permit transfer of the parison thereto, means for causing the separation of said cage members and means for registering each pair of the mold sections independently of the other.

6. In a glass forming machine, a pair of cage members, each member carrying registerable sections of a parison and a blow mold, levers on which said members are pivotally mounted, means for swinging said levers to separate the members and means to oscillate the members to cause the registering of either the parison or blow mold sections.

7. In a glass forming machine, a pair of cage members, each member carrying registerable sections of a parison and a blow mold, levers on which said cage members are pivotally mounted, means for swinging said levers to separate the cage members, and means whereby said respective mold sections are caused to close about the same axis.

8. In a glass forming machine, a pair of cage members, each member carrying registerable sections of a parison and a blow mold, levers on which said cage members are pivotally mounted, means for swinging said levers to separate said levers and cage members, means whereby said respective mold sections are caused to close about the same axis, a neck ring holder for the parisons carried with the cage members, and means whereby the blow mold sections are caused to close around the parison without relative movement of a parison.

9. In a glass forming machine, a pair of cage members, each member carrying registerable sections of a parison and blow mold, arms on which said members are pivotally mounted, cam means for oscillating said arms, and means including a cam to oscillate the cage members on said arms to cause the registering of either the parison or blow mold sections when the arms are oscillated toward each other.

10. In a glass forming machine, a pair of cage members, each member carrying registerable sections of a parison and a blow mold, arms on which said members are pivotally mounted, cam means for oscillating said arms, and means including a cam to oscillate the cage members on said arms to cause the registering of either the parison or blow mold sections about a given center line when the arms are oscillated toward each other.

11. In a glass forming machine, a pair of cage members, each member carrying registerable sections of a parison and a blow mold, arms on which said members are pivotally mounted, cam means for oscillating said arms, means including a cam to oscillate the cage members on said arms to cause the registering of either the parison or blow mold sections when the arms are oscillated toward each other and means for holding said sections in closed position.

12. In a glass forming machine, a pair of cage members, each member carrying registerable sections of a parison and a blow mold, arms on which said members are pivotally mounted, cam means for oscillating said arms, means including a cam to oscillate the cage members on said arms to cause the registering of either the parison or blow mold sections when the arms are oscillated toward each other and means for holding said members in separated position.

13. In a glassware forming machine a plurality of pairs of mold cages each comprising a parison and a blow mold section, a movable carrier supporting said mold cages, means for moving said carrier, means controlled and rendered operative by the movements of said carrier for causing the parison mold sections of each pair of cages to register and form a parison mold cavity for the shaping of the parison therein, means controlled by movement of the carrier and operative after the shaping of the parison for separating said mold cages away from the parison, independent supporting means for the parison during such separation, means controlled by additional movement of the carrier and operative thereafter for shifting the mold cages to cause the blow mold sections thereof to register and for closing said blow mold sections around the independently supported parison, the parison and blow mold sections being angularly disposed relative to each other, the transverse axis of each being at right angles to the axis about which said molds are shifted, and means for finishing the article in the closed blow mold sections.

14. In a glassware forming machine, a pair of mold cages each including parison mold and blow mold sections, a laterally movable support for each mold cage, means for pivotally mounting each mold cage on its support, and means for successively operating said movable supports and mold cages, so as to move said cages about their pivoted supports to align opposed parison or blow mold sections, and then move said supports to bring said opposed mold sections together to form a complete mold cavity.

15. In a glassware forming machine, a pair of mold cages each including parison mold and blow mold sections, angularly disposed with relation to each other, a laterally movable pivotal support for each mold cage, means for pivotally mounting each mold cage on its support, the transverse axis of each mold being normal to the axis of said pivotal support, and means for successively operating said movable supports and mold cages, so as to move said cages about their pivoted supports to align opposed parison or blow mold sections, and then move said supports to bring said opposed mold sections together to form a complete mold cavity.

16. In a glassware forming machine, a pair of mold cages each including parison mold and blow mold sections, a laterally movable support for each mold cage, means for rockably mounting each mold cage on its support, and means for successively operating said movable supports and mold cages, so as to move said cages about their supports to align opposed parison or blow mold sections, and then move said supports to bring said opposed mold sections together to form a complete mold cavity.

17. In a glassware forming machine, separate mold cages each carrying preliminary and final mold cavities with the neck ends of said cavities uppermost, mold cage actuating means connected to each of said cages for independent movement about spaced supports, said preliminary and final mold cavities being arranged side by side and disposed in angular relation to each other so that rocking of the mold cages through arcs of less than 180° will alternately cause the respective preliminary and final mold cavities to register.

18. In a glassware forming machine, separate mold cages each carrying preliminary and final mold cavities, mold cage actuating means connected to each of said cages for independent movement about spaced supports, said preliminary and final mold cavities being arranged side by side and disposed in angular relation to each other so that rocking of the mold cages through arcs of less than 90° will alternately cause the respective preliminary and final mold cavities to register.

19. In a glassware forming machine, a pair of cage members, each member of the pair carrying a section of a parison mold and a section of a blow mold, a movable carrier for said cage members adapted to move said cages successively to separate mold opening positions, including spaced transfer and discharge positions, means adjacent the transfer station and operative as a result of the movement of the carrier for opening the blank molds to permit transfer of the parison from the parison mold to the blow mold, and separate means adjacent the discharge station and operative as a result of carrier movement for opening the blow molds to permit the discharge of the finished ware.

20. In a glassware forming machine a plurality of pairs of mold cages each comprising a parison and a blow mold section, the cages and mold sections being permanently supported in neck end up position, a movable carrier supporting said mold cages, means for moving said carrier, means controlled and rendered operative by the movements of said carrier for causing the parison mold sections of each pair of cages to register and form a parison mold cavity for the shaping of the parison therein, means operative after the shaping of the parison for separating said mold cages away from the parison, independent supporting means for the parison during such separation, means operative thereafter for shifting the mold cages to cause the blow mold sections thereof to register and for closing said blow mold sections around the independently supported parison, and means for finishing the article in the closed blow mold sections.

21. In a glassware forming machine a plurality of pairs of mold cages each comprising a parison and a blow mold section, a movable carrier supporting said mold cages, a vertically disposed post on which each mold cage is independently mounted, means for moving said carrier, means controlled and rendered operative by the movements of said carrier for causing the parison mold sections of each pair of cages to register and form a parison mold cavity for the shaping of the parison therein, means operative after the shaping of the parison for separating said mold cages away from the parison, independent supporting means for the parison during such separation, means operative thereafter for shifting the mold cages to cause the blow mold sections thereof to register and for closing said blow mold sections around the independently supported parison, and means for finishing the article in the closed blow mold sections.

22. In a glassware forming machine a plurality of pairs of mold cages comprising a parison and a blow mold section, a movable carrier supporting said mold cages, a vertically disposed rockable post on which each mold cage is independently mounted, means for moving said carrier, means controlled and rendered operative by the movements of said carrier for causing the parison mold sections of each pair of cages to register and form a parison mold cavity for the shaping of the parison therein, means operative after the shaping of the parison for separating said mold cages away from the parison, independent supporting means for the parison during such separation, means operative thereafter for shifting the mold cages to cause the blow mold sections thereof to register and for closing said blow mold sections around the independently supported parison, and means for finishing the article in the closed blow mold sections.

23. A glassware forming machine as defined in claim 22 wherein each vertically disposed rockable post is carried by a laterally swingable bell crank lever arm.

24. In a glassware forming machine a plurality of mold cages each comprising a parison and a blow mold section, a movable carrier supporting said mold cages, means for moving said carrier, means controlled and rendered operative by the movement of the carrier for causing the parison mold section of each pair of cages to form a parison mold cavity for the shaping of the parison therein, cam means rendered operative after the shaping of the parison for separating the parison mold sections away from the parison and shifting the blow mold sections into position relative to the parison, independent supporting means for supporting the parison during such separation, pneumatically operative means for quickly moving the blow mold sections to closed position around the parison, and means for finishing the article in the closed blow mold sections.

25. In a glassware forming machine, a plurality of pairs of mold cages each comprising a parison and a blow mold section, a movable carrier supporting said mold cages, means for moving said carrier, means controlled and rendered operative by the movements of said carrier for causing the parison mold sections of each pair of cages to register and form a parison mold cavity for the shaping of the parison therein, means operative after the shaping of the parison for separating said mold cages away from the parison, independent supporting means for the parison during such separation, means operative thereafter for shifting the mold cages to cause the blow mold sections thereof to register and for closing said blow mold sections around the independently supported parison, means for releasing the independent supporting means after the blow mold sections are closed around the parison, and means for finishing the article in the closed blow mold sections.

EDWARD MILLER.